United States Patent [19]

Davies

[11] Patent Number: 4,940,873
[45] Date of Patent: * Jul. 10, 1990

[54] ROLLER ELECTRODES FOR ELECTRIC-RESISTANCE WELDING MACHINE

[76] Inventor: Joseph R. Davies, 220 West Haven, New Lenox, Ill. 60451

[*] Notice: The portion of the term of this patent subsequent to Oct. 25, 2005 has been disclaimed.

[21] Appl. No.: 173,764

[22] Filed: Mar. 28, 1988

Related U.S. Application Data

[63] Continuation-in-part of Ser. No. 53,375, May 22, 1987, Pat. No. 4,780,589.

[51] Int. Cl.⁵ ............................................. B23K 11/06
[52] U.S. Cl. ................................... 219/84; 219/64
[58] Field of Search ..................... 219/119, 80–84, 219/64

[56] References Cited

U.S. PATENT DOCUMENTS

| | | | |
|---|---|---|---|
| 4,188,523 | 2/1980 | Kawai et al. | 219/83 |
| 4,780,589 | 10/1988 | Davies | 219/84 |
| 4,782,207 | 11/1988 | Masuda et al. | 219/84 |

Primary Examiner—Leo P. Picard
Assistant Examiner—Lincoln Donovan
Attorney, Agent, or Firm—Charles F. Lind

[57] ABSTRACT

An improved roller electrode combination for use in electric-resistance welders, the electrode having relatively rotatable components separated by very small gaps, and a liquid contained by the components across the gaps; where said liquid is nontoxic, and is highly conductive, both electrically and thermally. The conductive liquid is of a composite eutectic mixture of galliun (Ga), indium (In), tin (Sn) and zinc (Zn), by weight, being approximately 61% Ga, 25% In, 13% Sn, and 1% Zn. A protective coating of the order between 0.0025 and 0.025 millimeters thick is plated on said surfaces of at least one of the components, being of material from gold and/or the platinum family, such as rhodium (Rh). Coolant is circulated through one of the components, and special controls regulate the coolant flow and/or warn of unsafe coolant temperatures; and the conductive liquid thermally cools the other component. The rotor component may be formed of a sintered mixture of copper (Cu) and tungsten (W). The rotor component further may have a circumferentially continuous raised rib, on the exterior peripherial face adapted to be closely adjacent and directly engage at least the adjacent of the overlapped edges of the material to be welded.

38 Claims, 3 Drawing Sheets

Fig. 5

ROLLER ELECTRODES FOR ELECTRIC-RESISTANCE WELDING MACHINE

This application is a continuation-in-part of my copending application filed May 22, 1987, having Ser. No. 07/053,375, now U.S. Pat. No. 4,780,589, and entitled ROLLER ELECTRODES FOR ELECTRIC-RESISTANCE WELDING MACHINE.

FIELD OF THE INVENTION

This invention relates to electric-resistance welding machines or welders, particularly to roller electrodes used in such, the electrodes being of the type having stationary and rotatably mounted components separated by clearance gaps; and an electrically and thermally conductive liquid contained by the components to bridge the gaps to conduct a welding current between the two components, and in certain instances also, to cool one of the components via a coolant flowing through the other component.

BACKGROUND OF THE INVENTION

Metal cans are fabricated by forming a flat metal blank, usually rectangular in shape, into a tubular configuration with the lateral ends or edges being lapped and welded together, defining a longitudinal seam. End closures are then secured across the open ends of the tubular configuration to complete the can formation. The term "tubular" is not restricted to a circular cross-section, as square or other shaped cans may be fabricated with this same approach. Also, similar continuously welded seams may be used for fabricating structural components other than cans.

One form of seam weld is made as opposed roller electrodes, one on the inside and one on the outside of the tubular configuration, continuously track along in the direction of the lapped ends. A large welding current is transmitted between the roller electrodes, via the small regions of contact defined between the opposing roller electrodes, between and through the lapped ends. The current is pulsed, to provide that the welded seam is actually comprised of a series of "spot welds", made closely adjacent one another.

With a tin-plated steel blank, a copper wire intermediate electrode, typically of rectangular cross-section, is fitted in a circumferential groove on each roller electrode, and pressed then against the opposite sides of the lapped ends. This serves to help carry the melted tin away from the welded seam region; although the tin does tend to solidfy and build up on the roller electrodes, and in the groove. Tin buildup increases the electrical resistance (compared to a new roller electrode), and reduces the effective welding current . . . resulting in erractic or even poor welds. This tin buildup periodically can be removed, by machining or "reprofiling" the periphery and groove of the roller electrode. As the roller electrodes must have specific minimum overall diameters and contact angles, reprofiling may be done only a limited number of times; thereafter, the roller electrode must be replaced. The steel blank could alternatively be zinc-coated, but the same buildup problems exist.

One form of inner roller electrode of this type commonly has a stator supported by the welding machine, and a rotor rotatably carried on the stator and having a circumferential guide groove for the copper wire. The rotor and stator are separated from one another by very small radial and circumferential clearance gaps (some possibly only 0.6 of a millimeter wide), across which the relative movement of the rotor and stator takes place. An electrically conductive liquid is sealed in the roller electrode, spanning substantial portions of the gaps, to conduct the welding current between the stator and rotor components. Appropriate bearings and surrounding insulators support relative rotation of the stator and rotor components, but otherwise electrically insulate these components from one another.

One form of roller electrode cooling provides for circulating a coolant liquid, commonly water charged with an anti-freeze, through passages defined in the stator. This cools the stator surfaces exposed to the electrically conductive liquid, and the electrically conductive liquid in turn then also serves to thermally cool the rotor.

The stator and rotor components of the roller electrodes are commonly formed of a copper alloy having a high content (possibly 98%) of copper, for yielding high electrical and thermal conductivity. Such an alloy also structurally resists deformation under the welding temperatures and pressures.

Modern welding equipment may weld with 6000 amperes of current at up to 40-50 kilowatts of power, giving a linear welding speed of 70 meters per minute, and yielding a production up to 600 cans per minute.

The electrically and thermally conductive liquid almost universally used in commerical roller electrodes has been mercury. Mercury remains a liquid to approxiamtely −38 degrees C, unequaled by any other conductive metal or eutectic mixture of metals, that is also stable at room temperatures. Mercury can carry the high welding currents needed in the roller electrode, and mercury can also provides sufficient cooling for the rotor.

Despite its wide use, mercury is not a willing first choice; in fact it has many very poor if not outright dangerous characteristics.

For example, mercury has electrical and thermal conductivities of approximately only 2% that of copper. The limited wetting ability of mercury adds to the reduced effectiveness of both electrical and thermal transmission between the stator and rotor components. Consequently, its presence: adds appreciably to the electrical current needed to generate the welding temperatures, which raises both the operating temperatures and cooling requirements; and gives off heat to the stator so poorly that the coolant may be heated only a few degrees in passing through the roller electrode, desipte being chilled to below room temperature, possibly between 5-15 degrees C. Moreover, the thermal expansion of mercury in the anticipated temperature range of use, 0-100 degrees C, is very large, so that complicated seals and/or overflow devices must be associated with the roller electrodes to accomodate this expansion.

Mercury is also very corrosive to the copper alloy stator and rotor components, producing an amalgam that limits both the shelf and operating lives of the roller electrode, to perhaps only several weeks. The amalgam, in its initial stage is gelatinous or paste-like, to increase drag against electrode rotation; whereas in its more advanced stages, it solidifies rock-hard to bind the componets together completely. Once solidifed, it is typically impossible to dislodge the amalgam and disassemble the electrode components, such as for rebuilding and salvaging them for a second work cycle. The amalgam has poorer electrical and thermal conductivities than fresh mercury, correspondingly imposing ever higher welding currents and cooling demands.

Attempts to extend the shelf life provide that the mercury roller electrode may be maintained under refrigeration and/or repositioned frequently. Also, manufacturers may ship the roller electrodes empty, with a separate supply of the mercury the user must pour into the roller electrode and seal, when the need arises.

Toxicity of mercury however, remains probably its most significant drawback, from a liability standpoint. Mercury is frequently looked upon as a substance requiring special standards of care, and government approvals for its wide scale use and disposal. Such restrains detract from the appeal of having the user fill the roller electrode with the mercury and/or add appreciably to the overall costs associated with its use in roller electrodes. Mercury leaks to the environment, or even the threat of it, can be unsettling.

Other electrically conductive liquids have been proposed, to avoid the above-mentioned problems of mercury. However, such generally have not found commerical application, because the roller electrode had to be modified so much that it would not work in conventional welding machines; or the current carrying capacity of the liquid was inadequate for the high output welding demands.

A roller electrode is disclosed in U.S. Pat. No. 3,501,611; non-mercury electrically conductive liquids are disclosed in U.S. at. Nos. 4,188,523 (69.5 +or−5 Atomic % of gallium, 15.2 +or −1.0 Atomic % indium, 6.1 +or−1.0 Atomic % tin, 4.5+or−0.8 Atomic % zinc, 3.2 +or−0.5 Atomic % silver, and 1.5 +or−0.5 Atomic % aluminum; 4,433,229 (pure gallium, or bianary metals or gallium including gallium/indium and gallium/tin); and U.S. Pat. No. 4,642,437 discloses a colbalt coating on the roller electrode. Foreign patents of interest might include West Germany Pat. Nos. 2,351,534 (Beck); 2,805,345 (Janitzka) and 3,432,499 (Lorenz); Swiss No. 597,971; and Japanese No. 0001583, disclosing different conductive liquids of gallium and/or different overlying coatings on the roller electrode.

SUMMARY OF THE INVENTION

The present invention provides improved mercury-free roller electrodes for use in electric-resistance welders, the electrodes having a substantially nontoxic highly conductive (both electrically and thermally) liquid contained by the components across the very samll rotational gaps between the components. Moreover, a protective plating on the hotter of the components exposed to the conductive liquid, further inhibits corrosion and lengthens the operating life. Low thermal expansion of the contained liquid reduces the demands of the containing seals; and the electrode has greatly extended shelf and operating lives.

The present invention provides a roller electrode having electrically and thermally conductive liquid of a composite eutectic mixture of gallium (Ga), indium (In), tin (Sn) and zinc (Zn). The specific composition, by weight, is approximately 61% Ga, 25% In, 13% Sn, and 1% Zn.

The present invention also provides having the rotor surfaces plated with a very thin layer of (1) gold (Ag); (2) rhodium (Rh); or (3) gold first and rhodium over the gold. This plated layer may be on: (1) the hotter rotor surfaces that will be exposed to the conductive liquid, specifically on the inside of the rotor opposite the copper wire electrode, serving to resist corrosion of the rotor; or (2) the hotter exterior rotor surfaces, specifically at the formed groove or trough that would normally guide the copper wire electrode, or at a circumferential rib, formed in place of the groove or trough, that would replace the copper wire electrode, each serving to resist wear of the rotor. Instead of rhodium, other members of the platinum family may be used, including platinum (Pt), iridium (Ir), palladium (Pd), ruthenium (Ru) or osmium (Os); but reduced conductivity and increased costs may make these alternatives more academic than practical.

The present invention also provides improved controls in the coolant system, including fine filters to clean the coolant, and temperature sensors and/or flow valves to provide for the operation of the roller electrodes only in the proper temperature ranges.

The present invention also provides a roller electrode having a rotor formed in part of a composite sintered mixture of copper (Cu) and tungsten (W), being in the range of 60-70% tungsten and 40-30% copper by weight. This provides increased rotor strength against deformation and mechanical wear, resistance to corrosive attack by the contained conductive liquid, and increased resistance against bonding of tin to said rotor, to minimize detrimental tin buildup on the exposed surface of the roller electrode. Other refractory metals, such as molybdenum (Mo) having good electrical conductivity, may also be used instead of tungsten in a composite sintered mixture of copper (Cu) and molybdenum (Mo), particularly when balancing the durability against the costs.

BRIEF DESCRIPTION OF THE DRAWINGS

The disclosure of the present invention includes the accompanying drawings, in which.

DETAILED DESCRIPTION OF ILLUSTRATED EMBODIMENTS

Figures 1, 2, 4, 8, 9:
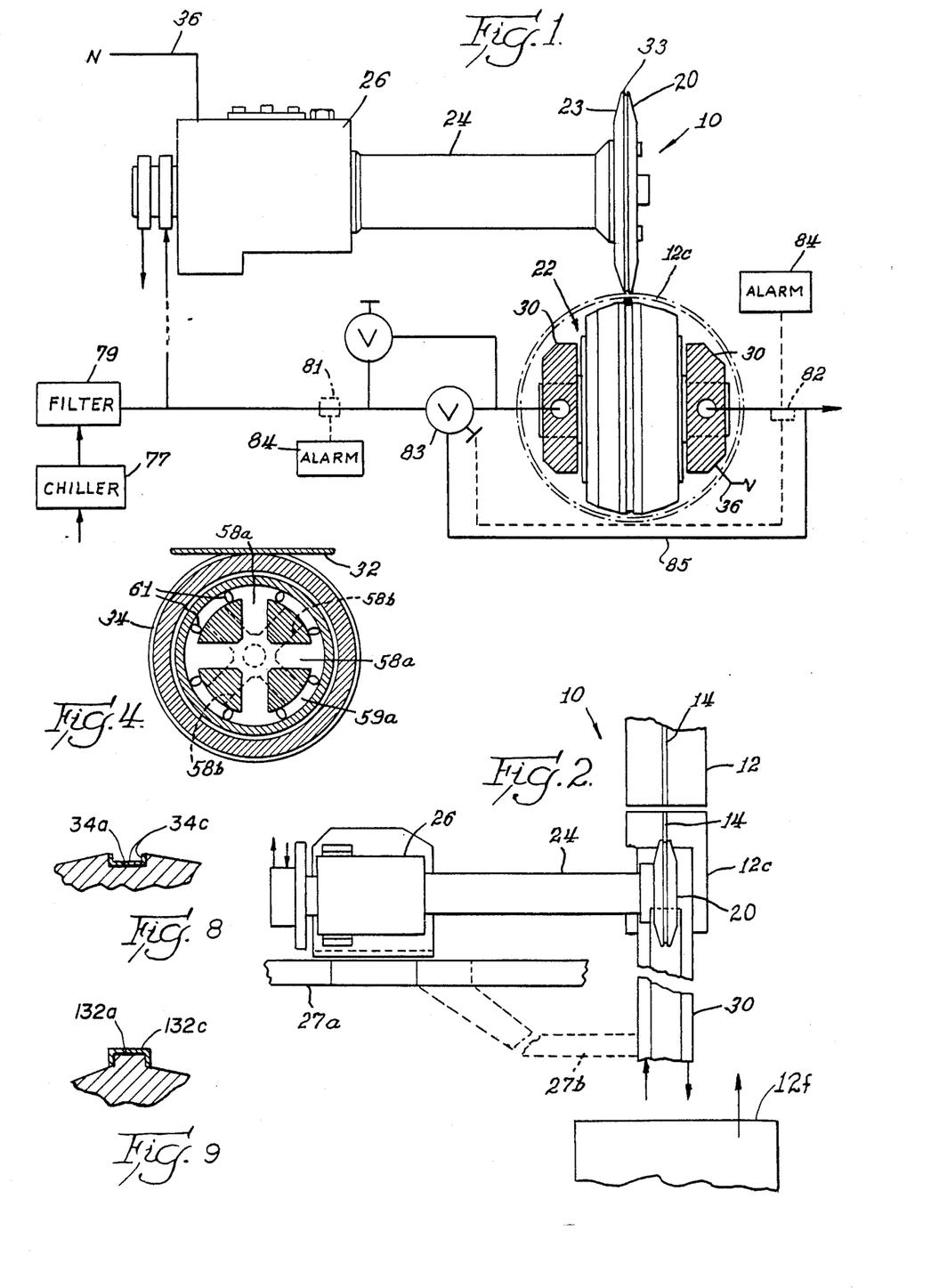
FIG. 1 is an elevational-type sectional view of electric-resistance welding equipment, taken generally in a direction axially in line with the formation of a tubular can, and illustrating a can blank in phantom and the inner and outer roller electrodes cooperating therewith.
FIG. 2 is a top plan-type view of FIG. 1.
FIG. 4 is a reduced sectional view taken generally from line 4—4 in FIG. 3.
FIGS. 8 and 9 are greatly enlarged sectional views, similar respectively to portions of FIGs. 3 and 7, illustrating alternative constructions of the rotor.

In FIGS. 1 and 2, appropriate roller electrode components of an electric-resistance welder 10 are illustrated, adapted to weld can blanks 12 along longitudinal seams 14, formed where opposite ends 16a and 16b (see FIG. 6) of each blank are overlapped slightly. The can blanks 12 typically will start out flat (as illustrated as 12f in FIG. 2), and will be moved in somewhat spaced edge-to-edge relation, in the direction of the seams 14, and will be reshaped by conventional reforming structure (not shown) to a tubular configuration 12c (shown in phantom only in FIG. 1) with the blank ends overlapped. Outer and inner roller electrodes 20 and 22, respectively identified relative to the tubular configuration 12c of the formed can blank 12, bear against the blank ends at the seam 14.

The outer roller electrode 20 has a disc-like member 23 keyed to an elongated shaft 24, at one end thereof; and the shaft at its opposite end is rotatably mounted at bearing housing 26. The bearing housing 26 is adjustably secured to frame 27a of the welding equipment 10, to orient the shaft 24 substantially perpendicular to the movement of the blanks 12 and the formation of the seams 14. The inner roller electrode 22 is mounted at one end of an elongated arm 30 that extends axially of the movement of the can blanks 12; and the arm 30 at the opposite end is adjustably supported relative to frame 27b of the welding equipment 10, where the blanks are flat or just beginning to be reshaped to be tubular. The inner roller electrode 22 will thus be located at the downstream end of the arm 30, relative to the direction of movement of the blanks 12.

Figures 3, 6, 7:
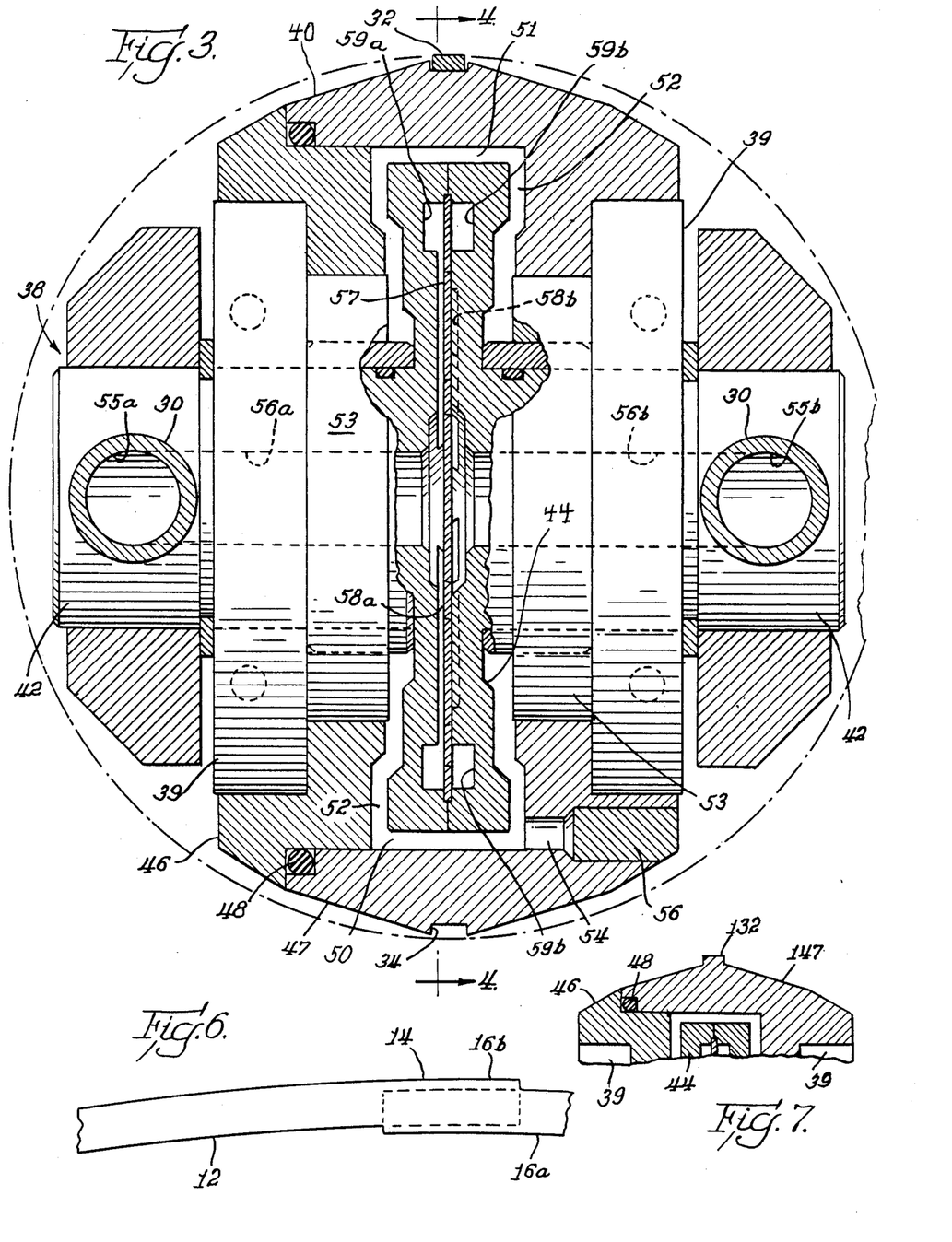
FIG. 3 is an enlarged sectional view, as seen from the same line of sight as FIG. 1, except through the center of an inner roller electrode used on the electric-resistance welding equipment of FIGs. 1 and 2.
FIG. 6 is a greatly enlarged sectional view, similar to FIG. 1, illustrating the seam weld formed in the mated edges of the can blank.
FIG. 7 is a transverse sectional view of a modified roller electrode.

Generally, a copper wire 32 is fitted in annular grooves 33 and 34, respectively in the roller electodes 20 and 22, to bear directly against the overlapped blank ends 16a and 16b; but only the inner electrode wire 32 received in electrode groove 34 is illustrated in FIGS. 3 and 4. A pulsed welding current is carried between appropriate conductors 36 (FIG. 1), via the outer roller 20, the sandwiching copper wires 32 and the overlapped can blank end 16a and 16b, the inner roller 22, and the support arm 30.

FIGS. 3 and 4 illustrate the inner roller electrode 22 in greater detail, the electrode having a stator 38, and a rotor 40 supported by sealed bearings 39 to rotate on the stator 38 about an axis disposed transverse to the arms 30. The stator 38 may be of a unitary construction, including extended ends 42 keyed nonrotatably to the inner roller electrode support arm 30, and a central disc 44 between the extended ends 42. The rotor 40 typically has two adjacent sections 46 and 47 press-fit or otherwise secured together and sealed by O-ring 48 at the overlapping joint.

The joined rotor sections 46 and 47 define a cavity 50 larger than the stator disc 44; and the generally concentric stepped adjacent faces of each are closely spaced from one another across a peripherial gap 51 and opposed side gaps 52. Seals 53 operate between the stator 38 and rotor 40 to seal and electrically insulate these components relative to one another. An electrically and thermally conductive liquid (not shown) fills approximately 80-90% of this sealed roller interior or cavity 50, tap 54 being used for this and then closed with plug 56. The liquid bridges the gaps 51 and 52 between the stator and rotor; electrically and thermally connecting the stator 42 and rotor 44 together, while allowing relative rotation of these components.

Axially extended coolant passages 55a and 55b formed in the arm 30 communicate with one another via axial, radial and peripherial passages fromed in the stator 38. In the roller electrode 22 illustrated, the stator ends 42 have axial passages 56a and 56b extended to opposite sides of a partition 57 fitted in the stator disc, and four radial passages 58a and 58b respectively on opposite sides of the partition extend between the central passages 56a and 56b, and annular passages 59a and 59b on opposite sides of the partition. As illustrated, the four radial passages 58a and 58b on each side of the partition are angled approximately 90 degrees apart; and the passages on one side are angled to lie approximately midway between the passages on the other side. Through openings 61 formed in the partition 57 connects the two annular passages 59a and 59b together, at locations approximately midway between the eight radial passages 58a and 58b.

Figure 5:
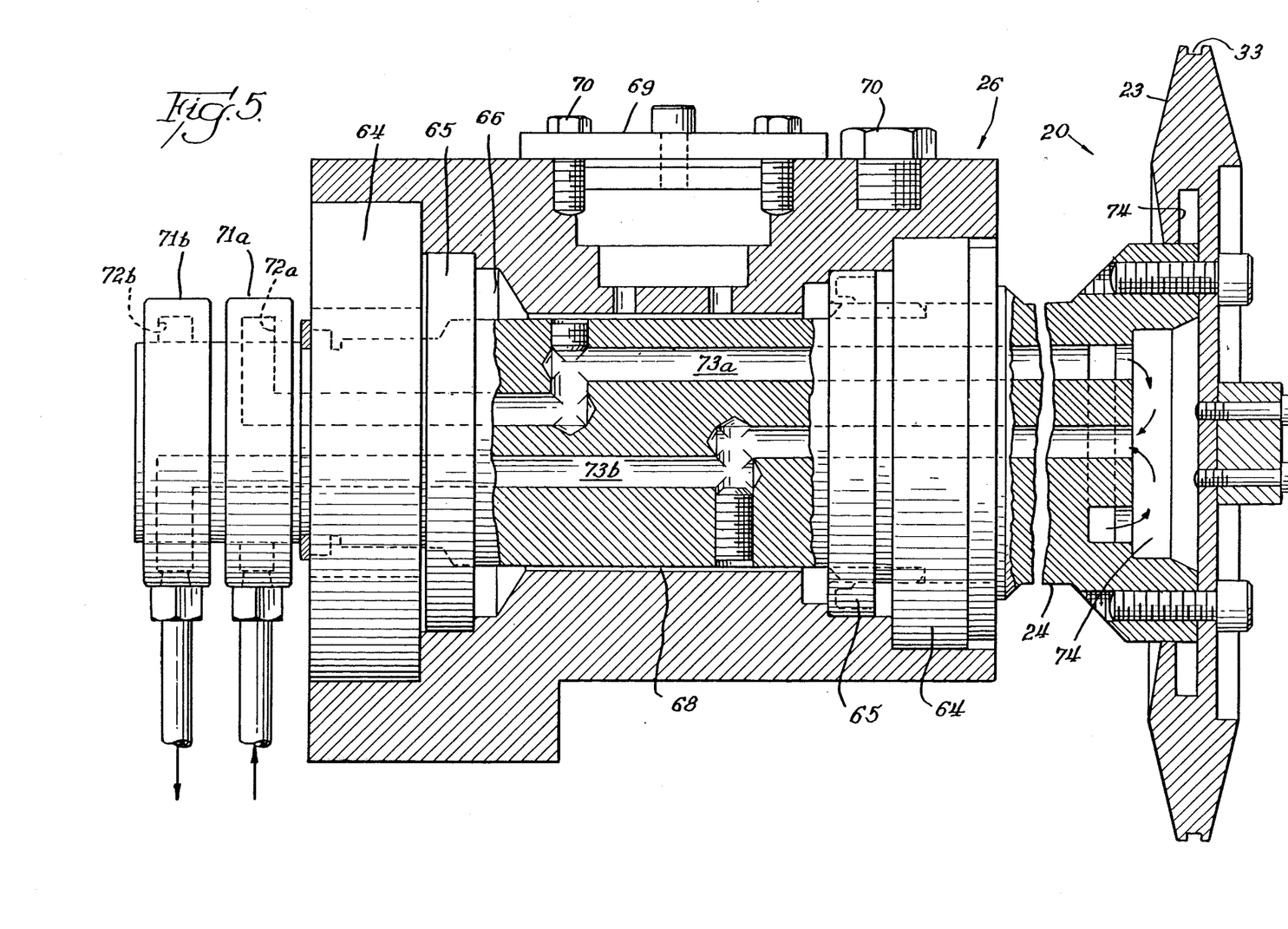
FIG. 5 is an enlarged sectional view, as seen from the same line of sight as FIG. 1, except through the interior of an outer roller electrode used on the electric-resistance welding equipment of FIGS. 1 and 2.

The housing 26 illustrated in FIG. 5 has sealed bearings 64 and rotary seals 65 that cooperate to rotate the shaft about its longitudinal axis, while sealing the components together against liquid leakage and while electrically insulating the components from one another. The housing cavity 66 is larger than the shaft 24, and generally concentric adjacent faces of each are closely spaced from one another across a peripherial gap 68. An electrically conductively liquid (not shown) fills approximately 80-90% of this sealed housing interior 66, fill cap 69 being used for this and closed by bolts 70. The liquid bridges the peripherial gap 68 between the shaft 24 and housing 26; electrically connecting the components together, while allowing relative rotation between them.

Collar manifolds 71a and 71b are sealed around the shaft 24, at one end thereof adjacent the housing 26, communicating via radial passages 72a and 72b, and axially extended passages 73a and 73b formed in the shaft 24, with passages 74 formed in the disc 23 of the outer roller electrode.

Coolant may be circulated through the outer and inner roller electrodes, for cooling them. As is illustrated in FIGS. 1 and 2, the coolant may be passed through a chiller 77 and a filter 79, and then in parallel through the outer and inner roller electrodes 20 and 22, respectively. In circulating through the stator 38 the coolant may enter from one passage 55a of the arm 30, pass outwardly in one set of four radial passages 58a to the one annular passage 59a, cross over via the openings 61 to the other annular passage 59b, move inwardly in the other set of four radial passages 58b, and exit via the other passage 55b of the arm 30.

The rotor 40 is cooled by the thermal conductivity of the conductive liquid, across the gaps 51 and 52 between the stator disc 44 and rotor. In modern practice, some of the coolant passages in the stator may be of very small cross-section, as small as 1.0 millimeter across; and up to possibly five gallons per minute of the coolant may be circulated through these flow passages, representing very high coolant flow velocity.

As will be appreciated, the outer roller electrode may have both the stator and rotor components cooled by the circulating coolant, so that the conductive liquid need only carry the electric current between these components and not cool one from the other. Moreover, the stator of the outer roller electrode surrounds part of the associated rotor in supporting the rotor, instead of the rotor surrounding the stator as in the inner roller electrode.

The invention provides for the use of an improved electrically and thermally conductive liquid, having many advantages over the most conventional liquid commercially used, namely mercury. The improved conductive liquid is a composite eutectic mixture of gallium (Ga), indium (In), tin (Sn) and zinc (Zn). The approximate composition, by weight, is 61% GA, 25% In, 13% Sn, and 1% Zn.

Some important, unusual and benefical properties of using this conductive liquid in the roller electrodes, particularly when compared to mercury, are:

1. The conductive liquid is essentially nontoxic, and provides roller electrodes safe even for forming cans intended for foodstuff.

2. The thermal expansion of the conductive liquid is relatively low, in the anticipated operating temperature range between possibly 5 and 100 degrees C. This reduces problems of seal damage and/or overfilling the roller electrode, even when filling up to 85-95% maximum capacity, and also allows the roller electrode, filled to this greater percentage, to provide a larger percentage of the components' surfaces wetted by and exposed to the liquid, reducing the unit density of current.

3. The corrosive reaction of the conductive liquid against copper and/or copper alloys is very low at temperatures below 100 degrees C, which may be obtainable with proper roller electrode cooling, anticipating very long expected shelf life and operating life for such roller electrodes.

4. The conductive liquid has electrical and thermal conductivities almost four times better than mercury, and has much better "wetting" characteristic than mercury; providing that such roller electrodes product equilivent or even better welds, compared to mercury roller electrodes, at less electrical current and at reduced overall operating temperatures.

5. The conductive liquid deteriorates to a putty-like consistency . . . not a rigid solid, allowing for stator and rotor component disassembly and rebuilding, for greater overall economy.

As the disclosed conductive liquid provides overall less resistance to the welding current, less operating heat will be built up in the roller electrodes. Moreover, the disclosed conductive liquid provides overall good wetting of the interior stator and rotor surfaces, to offer good thermal cooling and electrical conductivity across the gaps between the stator and rotor. Also, an equilivent welding temperature and weld can be obtained with less overall welding current, compared to a weld made with a conventional mercury roller electrode.

Another aspect of this invention provides that inner roller electrode 22 is coated, on the inside rotor surface that is to be exposed to the conductive liquid, as a means to reduce corrosive reaction between the conductive liquid and the copper and/or copper alloy structural material of the rotor. Because of the intense heat of the rotor in the rim region opposite the actual welding contact, this region is most critical to corrosive attack of the conductive liquid and should be coated. Because the stator surfaces exposed to the conductive liquid are generally much cooler than any of the rotor surfaces exposed to the conductive liquid, and below the temperatures where the conductive liquid would attack the copper alloy stator, the stator surfaces generally should not be coated.

In one embodiment, gold (Ag) is used, electroplated to a thickness of between 0.0025 and 0.025 of an millimeter. The gold has electrical conductively about 60% that of copper; but the minimum thickness does not appreciable add to the overall resistance of the welding current. Gold improves resistance against corrosive of the disclosed conductive liquid against the copper and/or copper alloy of the rotor; at most operating tempertures of the roller electrode.

In another embodiment, rhodium (Rh) is used, electroplated to a thickness of between 0.0025 and 0.025 of an millimeter. The rhodium has electrical conductively about one-third that of copper; but the minimum thickness does not appreciable add to the overall resistance of the welding current. Rhodium improves resistance against corrosive of the disclosed conductive liquid against the copper and/or copper alloy of the rotor; at even elevated operating temperatures. The rhodium coating also reduces corrosive of conventional mercury against the copper and/or copper alloy of the rotor, making it advantageous to use this rhodium coating even in a conventional mercury-filled roller electrode.

In yet another and preferred embodiment, gold may be electroplated onto the rotor surface, and the rhodium may be electroplated onto the gold. this gold-rhodium combination will tpically be more economical than plating with just gold and/or rhodium, particularly when compared to the overall improved performances. The thickness of gold may be between 0.001and 0.0125 of a millimeter, and the thickness of rhodium may be slightly less; so that the overall plating may thus possibly be of the order of 0.0015-0.025 of a millimeter thick. As noted, rhodium provides good resistance against any corrosive reaction of the disclosed conductive liguid and/or mercury against the copper alloy rotor.

The roller electrode may be coated also, on the outside rotor surface, as a means to reduce wear of the copper alloy structural material, and/or to reduce buildup of tin or zinc on the rotor periphery.

FIG. 8 shows an enlarged illustration or inside roller electrode and the rotor groove 34a, sized and shaped to receive and guide the copper wire electrode 32. The coating 34c would be on the bottom and adjacent sides of the groove 34a. FIG. 9 shows an enlarged illustration of the inside roller electrode, where the rotor groove would be replaced with an annular continuous raised rib 132a. With this embodiment, no copper wire electrode 32 would be used, but the rib 132a itself would ride against the overlapped edges of the can blanks. The coating 132c would be on the top and adjacent sides of the rib 132a.

A preferred coating would be of gold electroplated onto the rotor surface, and rhodium electroplated onto the gold. The thickness of gold may be between 0.001 and 0.0125 of a millimeter, and the thickness of rhodium may be more; so that the overall plating may thus possibly be of the order of 0.0025-0.040 of a millimeter thick. Rhodium may be used alone as an alternative, being electroplated directly onto the rotor surface. Rhodium provides good resistance against mechanical wear of the groove, to increase the operating life of the roller electrode before having to reprofile the rotor periphery, specifically at the annular groove. Rhodium also resists tin and zinc buildup in the groove and/or on the raised rib.

Instead of rhodium, other members of the platinum family may be used, including platinum (Pt), iridium (Ir), palladium (Pd), ruthenium (Ru) or osmium (Os), particularly when balancing conductivity against costs.

Because the coating, regardless of its composition, has greater resistivity than the copper alloy of the rotor and/or stator component, the coating should be made only where needed. Also, the rotor of outer roller electrode 20 may advantageously be coated in the region of the copper wire electrode groove 33 and/or in the region of the continuous raised rib 132a used instead of the copper wire electrode, for increasing resistance against mechanical wear of the groove or raised rib.

To have any disclosed improved roller electrode operate properly for its expected long life, the temperature and quality of the coolant must be extensively regulated. This includes protection against impurties in the coolant, or buildup of slag, oxidation or the like on the walls of the coolant passages. . .all of which lead to reduced cooling, and the possible resultant overheating and greater corrosive activity of the liquid against the components. Thus, a thin coating of silver may be electroplated on or otherwise applied to the walls of the coolant passages, which inhibits the oxidation of the passage walls, particularly where the roller electrode is formed of a copper alloy. The thickness of the silver coating may be between 0.001 and 0.0125 of a millimeter.

On the other hand, excessive cooling can also be very damaging to the operating life of the improved electrode rollers, causing the liquid to change phase at approximately 3 degrees C. Excessive cooling is possible if welding may be discontinued over any length of time, while the chiller operation and coolant flow continued, as if there was no stoppage.

As thus illustrated in FIG. 1, the coolant flow to the roller electrodes is from chiller 77 through a filter 79, of possibly 10–50 micron size, to trap out all but the smallest particles that may otherwise block the very small coolant passages of the roller electrodes. Inlet and outlet temperature sensors 81 and 82 are in the coolant flow circuit of the welding equipment, to sense both the safe low inlet and high outlet operating temperatures. As the conductive liquid may change phase at temperatures below approximately 3 degrees C, the low safe inlet temperature range may be set some several degrees above this. The safe outlet temperatures normally would be in the range of 5–20 degrees C, and the low and high safe limits may be selected as such. The sensors 81 and 82 may activate an audible and/or visual alarm 84 to advise of either excessive heating or cooling.

The sensor 82 may slco activate a variable flow value 83, to close it and circulate the coolant via line 85 around the roller electrode, responsive to a sensed coolant temperature that may be too cold, or in the event of excessive cooling. A bleed valve 86 may bypass this valve 83, to allow limited flow through the roller electrode even when the valve 83 is closed.

It should be remembered that even with the best known protective coatings on the copper alloy stator and/or rotor components, the conductive liquid will become polluted over time and usage due to the corrosion of these components, and the electrical and thermal conductive capacities of the conductive liquid accordingly then deteriate. This means that the welding current must be increased to accomplish the same weld, and the operator of the welder periodically does increases the welding current to help keep the welds somewhat uniform over time. This increased current inputs more heat to the roller electrode, but unfortunately when the conductive liquid simultaneously provides reduced cooling effectiveness, thereby allowing the overall roller electrode temperature to rise, which accelerates even more the corrosive activity of the conductive liquid.

To help compensate for this, the valve 83 would also have first and second opened positions, allowing different rates of coolant flow through it in such positions.

The valve would be initially in the first opened position, which would be sized to allow sufficient coolant flow through it to cool the roller electrode when the conductive liquid is fresh and at both its best thermal and electrical conductivity rates. This flow rate might be between two and three liters per minute, for example. The sensor 82 would be set to shift the valve 83 to its second opened position, responsive to a predetermined increase in the sensed coolant temperature. The valve in its second opened position would increase the coolant flow rate, to perhaps up to even five liters per minute, for increased cooling capacity; and this would occur automatically when as and the conductive liquid becomes polluted and its conductivity rates drop.

The inner and outer electrode rollers can have parallel coolant flow hookups, or separate controls and flow lines can be provided for each; although for simplicity, only the flow for the inner roller electrode 22 is illustrated.

Some degree of care is also needed for shipping and/or storing the disclosed roller electrodes, for maintaining them above the lower phase change temperature. Once done, the disclosed roller electrode will otherwise have a very extended, almost unlimited, shelf life. Even should the disclosed conductive liquid thicken because of being excessively cooled, it will only be gelatinous or slushy, not solid, and it may be usable after warming again and returning to the liquid phase.

The rotor may be made of a copper alloy having approximately 0.3–.7% Beryllium (Be), 1.5–2.0% Nickel (Ni), with the balance Copper (Cu); or up to possibly 0.3% Cobalt (Co) may be added too. This material has sufficient hardness to withstand the temperatures and pressures associated with the rotor; and adequate conductivity. The stator is not subjected to the same temperature and pressure extremes as the rotor, and may be made up of a copper alloy having approximately 1% Chromium (Cr) and the balance Copper (Cu); being much more conductive than, but not as hard as, the rotor material. The rotor and stator materials, and the more conductive liquid, provide less resistance to the electrical current through the roller electrode, to produce less heat and otherwise a better weld, than obtained with a mercury roller electrode and/or an electrode having the stator made of the same material as the rotor.

The rotor section 47 may alternatively be made of a sintered mixture of tungsten and copper, of the order of 60–70% tungsten (W) and 40–30% copper (Cu). Of great significance, tin does not bond to or buildup on this sintered material, greatly extending the period between, or possibly even eliminating completely the need for, reprofiling the rotor periphery. The sintered rotor section provides uniform thermal expansion and contraction. The rotor section 46 may be formed of the same sintered material, or may be formed of the copper-/alloy.

The sintered tungsten and copper rotor has great resistance against corrosion, up to temperatures of the order of 600 degrees C, It also is structurally durable against mechanical wear, approximately four times better than the typical copper alloy rotor. This reduces the wear of the rotor periphery, including wear of the groove 33, where wear changes of the exterior rotor shape or groove debth adversely reduce the performance and/or operating life of the roller electrode. Although the conductivity of the sintered tungsten and copper rotor is perhaps one-third less than the conventional copper alloy rotor, the improved structural properties and the improved conductivity of the disclosed conductive liquid tend to compensate one another. The overall combination is likely to achieve welding performances comparable to those of the conventional mercury roller electrodes.

The rotor section 147 (FIG. 7) of the sintered tungsten-copper mixture may have a circumferentially continuous raised rib 132 formed on the rotor periphery at a location where the intermediate wire electrode groove (like 34) would be; although this rib need not have any coating. As noted above, during use then the rotor rib would ride against the overlapped edges of the can blank; and no intermediate electrode wire (like 32) would be used between the rotor and the can blank 12.

Other refractory metals, such as molybdenum (Mo), having good electrical conductivity may also be used instead of tungsten, in a sintered molybdenum-copper mixture of the order of 55–75% molybdenum (Mo) and 45–25% copper (Cu), particularaly when balancing the durability against the costs.

Another aspect of the disclosed roller electrodes is the rebuilding program possible with them, providing for greatly increased overall electrode roller economy. Thus, after the roller electrode has failed, because of a bad bearing or even after the conductive liquid being polluted to the stage that it is gelatinous or slushy, the components may still be easily disassemblied.

Once separated, the stator and rotor components may be cleaned inside and out, as needed. The component surfaces that were exposed to the conductive liquid may be blasted with glass beads, to clean them without removing component material, or with aluminum oxide for removing the more difficult surface impurities. It has been observed that the conductive liquid does not permanently contaminate the exposed component surfaces, as mercury tends to do, so that they can be cleaned up real good. The coolant passages may be cleaned by flushing with an acetic acid, including with abrasive such as glass beads or aluminum oxide. Generally, the components are not recoated during this rebuilding program. The cleaned components may be reassembled with new or rebuilt bearings and seals, and recharged with fresh conductive liquid. The rebuild roller electrode may be reprofiled as needed before being reinstalled on the welder.

While the disclosure has beed directed more to the inner roller electrode, it should be appreciated that many of the same inventive aspects will apply equally well to the outer roller electrode.

Some inner roller electrodes 22 of the disclosed design, have operated in-the-field to weld in excess of 34 million cans, on conventional electric resistance welders.

What I claim as my invention is:

1. In a roller electrode adapted for use in electric resistance seam welding apparatus to weld overlapped edges of a metal blank, the roller electrode having stator and rotor components, the rotor and stator components having annular surfaces spaced apart across thin gaps, bearing means for mounting said rotor to rotate relative to said stator with movement via said gaps, and a conductive liquid simultaneously contacting said annular surfaces to electrically conduct a welding current across said gaps between the components, the improvement comprising the combination of said conductive liquid being of a composite eutectic mixture of gallium (Ga), indium (In), tin (Sn) and zinc (Zn), by weight, being substantially 61% Ga, 25% In, 13% Sn, and 1% Zn.

2. A roller electrode combination according to claim 1, further wherein said metal blank is curved over a full 360 degrees to a tubular configuration; the roller electrode being adapted to be disposed inside of the tubular configuration; and said rotor having an exterior peripherial face adapted to cooperate with the overlapped blank edges and said exterior peripherial face being opposite portions of said annular rotor surfaces, and a protective coating being formed on said portions of the annular rotor surfaces, and said protective coating being of rhodium (Rh).

3. A roller electrode combination according to claim 2, wherein said protective coating includes gold (Au) plated directly on the rotor and the said rhodium (Rh) plated on the gold.

4. A roller electrode combination according to claim 2, wherein another protective coating is formed on said rotor, on the exterior peripherial rotor face adapted to cooperate with the overlapped blank edges, and said protective coating being of rhodium (Rh).

5. A roller electrode combination according to claim 4, wherein each of said protective coatings includes gold (Au) plated directly on the rotor and the said rhodium (Rh) plated on the gold.

6. A roller electrode combination according to claim 1, wherein the roller electrode has coolant flow passages defined therein; means to circulate coolant through the flow passages including via an inlet to the passages and an outlet from the passages; flow control means located outside of the roller electrode and connected substantially in a series flow connection with the inlet; and means to sense the coolant temperature at the outlet and to change the flow control means to direct greater relative coolant flow to the roller electrode when the coolant temperature at the outlet increases.

7. A roller electrode combination according to claim 1, wherein the roller electrode has coolant flow passages defined therein; means to circulate coolant through the flow passages including via an inlet to the passages and an outlet from the passages; flow control means located outside of the roller electrode and connected substantially in a series flow connection with the inlet; and means to sense the coolant temperature and to change the flow control means to direct lesser relative coolant flow to the roller electrode when the coolant temperature becomes too cold for the conductive liquid.

8. A roller electrode combination according to claim 7, further including bypass line means located outside of the roller electrode and connected substantially in a parallel flow connection therewith between the flow control means and outlet; and said flow control means being operable to vary the relative coolant flow directed to the roller electrode and to the bypass line means, responsive to changes of the coolant temperature.

9. In a roller electrode adapted for use in electric resistance seam welding apparatus to weld overlapped edges of a metal blank, the roller electrode having stator and rotor components, the rotor and stator components having annular surfaces spaced apart across thin gaps, bearing means for mounting said rotor to rotate relative to said stator with movement via said gaps, and a conductive liquid simultaneously contacting said annular surfaces to electrically conduct a welding current across said gaps between the components, the improvement comprising a thin protective coating formed on certain of said annular rotor surfaces that would contact the conductive liquid, and said protective coating being of gold (Au) and/or material from the platinum (Pt) family.

10. A roller electrode combination according to claim 9, wherein said protective coating is formed only on said annular rotor surfaces, and the annular surfaces of said stator adjacent the said thin gaps and that would contact the conductive liquid are without any protective coating.

11. A roller electrode combination according to claim 10, wherein said protective coating includes gold (Au) plated directly on the said annular rotor surfaces and said material from the platinum (Pt) family then being plated on the gold.

12. A roller electrode combination according to claim 10, further wherein the platinum family material of said protective coating is rhodium (Rh), and the protective coating is of rhodium plated directly on the annular rotor surfaces.

13. A roller electrode combination according to claim 10, wherein said protective coating includes gold (Au) plated directly on the annular rotor surfaces and the platinum (Pt) family material is rhodium (Rh) and it is plated on the gold.

14. A roller electrode combination according to claim 13, further wherein said rotor has an exterior peripherial face adapted to cooperate closely adjacent the overlapped blank edges during welding; certain of said annular surfaces of the rotor being opposite to the peripherial rotor face; and said protective coating being formed on those certain annular rotor surfaces opposite to the peripherial rotor face.

15. A roller electrode combination according to claim 9, further wherein said rotor and stator are formed of different materials, said rotor being formed of a material durable under high temperatures and pressures, and electrically and thermally conductive; and said stator being formed of a material having less durability under high temperatures and pressures, but having greater electrical and thermal conductivity, than the material forming the rotor.

16. A roller electrode combination according to claim 15, further wherein said rotor material is a copper alloy having approximately 0.3–.7% Beryllium (Be), 1.5–2.0% Nickel (Ni), with the balance Copper (Cu); and said stator material is copper alloy having approximately 1% Chromium (Cr) and the balance Copper (Cu).

17. A roller electrode combination according to claim 16, wherein said protective coating includes gold (Au) plated directly on the annular surfaces of the rotor and the platinum (Pt) family material being rhodium (Rh) and being plated on the gold, and further wherein said electrically conductive liquid is of a composite eutectic mixture of gallium (Ga), indium (In), tin (Sn) and zinc (Zn), by weight, being substantially 61% Ga, 25% In, 13% Sn, and 1% Zn.

18. A roller electrode combination according to claim 15, further wherein said rotor has an exterior peripherial face adapted to be closely adjacent the overlapped edges of the blank; certain of said annular surfaces of the rotor being opposite to the peripherial rotor face, and the rotor in this region between said certain annular surfaces and the peripherial face being structural and being formed only of a composite sintered mixture of copper (Cu) and tungsten (W), in the range of 60–70% tungsten and 40–30% copper, by weight.

19. In a roller electrode adapted for use in electric resistance seam welding apparatus to weld overlapped edges of a metal blank, the roller electrode having stator and rotor components, the rotor and stator components having annular surfaces spaced apart across thin gaps, bearing means for mounting said rotor to rotate relative to said stator with movement via said gaps, and a conductive liquid simultaneously contacting said annular surfaces to electrically conduct a welding current across said gaps between the components, the improvement comprising said rotor having an exterior peripherial face adapted to be closely adjacent the overlapped blank edges during welding; certain of said annular surfaces of the rotor being opposite to the peripherial rotor face, and the rotor in this region between said certain annular surfaces and the peripherial face being structural and being formed only of a composite sintered mixture of copper (Cu) and tungsten (W), in the range of 60–70% tungsten and 40–30% copper, by weight.

20. In a roller electrode adapted for use in electric resistance seam welding apparatus to weld overlapped edges of a metal blank, the roller electrode having stator and rotor components, the rotor surrounding the stator and these components having annular surfaces spaced apart across thin gaps, bearing means for mounting said rotor to rotate relative to said stator with movement via said gaps, and a conductive liquid simultaneously contacting said annular surfaces to electrically conduct a welding current across said gaps between the components and to thermally cool said rotor from a cooled stator, the improvement comprising said rotor having an exterior peripherial face adapted to be closely adjacent the overlapped blank edges, and certain of said annular rotor surfaces being opposite to the peripherial rotor face; and said stator having coolant flow passages defined therein including:

axial inlet and outlet passages located on opposite axial sides of the stator;

separate annular passages disposed circumferentially of the stator closely adjacent the said certain stator annular surfaces and the defined gaps;

a plurality of separate circumferentially spaced inlet and outlet radial passages respectively located on opposite axial sides of the stator and communicating with the respective inlet and outlet passages and with the respective annular passages, said radial passages each being of a substantially small cross section and being circumferentially offset from one another; and through openings communicating between the separate annular passages, at locations between the radial passages, thereby defining tortious paths through the stator between the inlet and outlet passages and causing circumferential flow over all of the separate annular passages, for high cooling effectiveness of the certain annular stator surfaces at the defined gaps and particularly opposite said certain annular rotor surfaces, for high cooling effectiveness of the peripherial rotor face via the rotor and the conductive liquid across the gaps.

21. In a roller electrode adapted for use in electric resistance seam welding apparatus to weld overlapped edges of a metal blank, the roller electrode having stator and rotor components, the rotor surrounding the stator and these components having annular surfaces spaced apart across thin gaps, bearing means for mounting said rotor to rotate relative to said stator with movement via said gaps, and a conductive liquid simultaneously contacting said annular surfaces to electrically conduct a welding current across said gaps between the components and to thermally cool said rotor from a cooled stator, the improvement comprising said rotor having an exterior peripherial face adapted to be closely adjacent the overlapped blank edges, and certain of said annular rotor surfaces being opposite to the peripherial rotor face;

a protective coating formed on said annular rotor surfaces in the region of the defined gaps that contact the conductive liquid, said protective coating being of gold (Au) and/or material from the platinum (Pt) family, and said annular stator surfaces in the region of the defined gaps that contact the conductive liquid, being void of any protective coating; and said stator having coolant flow passages defined therein including:

axial inlet and outlet passages located on opposite axial sides of the stator;

annular passages disposed circumferentially of the stator;

separate inlet and outlet radial passages located on opposite axial sides of the stator and communicating with the respective inlet and outlet passages and with the annular passages, said radial passages being circumferentially offset from one another; and through openings communicating between the annular passages, at locations between the radial passages, thereby defining tortious paths through the stator between the inlet and outlet passages and causing circumferential flow over all of the annular passages, for high cooling effectiveness of the annular stator surfaces at the defined gaps and particularly opposite said certain annular rotor surfaces, for high cooling effectiveness of the peripherial rotor face via the rotor and the conductive liquid across the gaps.

22. A roller electrode combination according to claim 21, wherein said protective coating includes gold (Au) plated directly on the annular rotor surfaces, and rhodium (Rh) plated on the gold.

23. A roller electrode combination according to claim 20, further wherein said rotor and stator are formed of different materials, said rotor being formed of a material durable under high temperatures and pressures, and electrically and thermally conductive; and said stator being formed of a material having less durability under high temperatures and pressures, but having greater electrical and thermal conductivity, than the material forming the rotor.

24. In a roller electrode adapted for use in electric resistance seam welding apparatus to weld overlapped edges of a metal blank, the roller electrode having stator and rotor components, the rotor and stator components having annular surfaces spaced apart across thin gaps, bearing means for mounting said rotor to rotate relative to said stator with movement via said gaps, and a conductive liquid simultaneously contacting said annular surfaces to electrically conduct a welding current across said gaps between the components, the improvement comprising the combination of said rotor and stator being formed of different materials, said rotor being formed of a copper alloy having approximately 0.3-.7% Beryllium (Be), 1.5-2.0% Nickel (Ni), with the balance Copper (Cu), thereby being durable under high temperatures and pressures, and electrically and thermally conductive; and said stator being formed of a copper alloy having approximately 1% Chromium (Cr) and the balance Copper (Cu), thereby having less durability under high temperatures and pressures, but having greater electrical and thermal conductivity than the rotor.

25. A roller electrode combination according to claim 24, further wherein the conductive liquid is of a composite eutectic mixture of gallium (Ga), indium (In), tin (Sn) and zinc (Zn), by weight, being substantially 61% Ga, 25% In, 13% Sn, and 1% Zn.

26. In an electric resistance seam welding apparatus to weld overlapped edges of a metal blank, including a roller electrode having stator and rotor components, the rotor and stator components having annular surfaces spaced apart across thin gaps, bearing means for mounting said rotor to rotate relative to said stator with movement via said gaps, a conductive liquid simultaneously contacting said annular surfaces to electrically conduct a welding current across said gaps between the components, the improvement comprising the combination of the stator having coolant flow passages defined therein; means to circulate coolant through the stator passages including via an inlet to the passages and an outlet from the passages; flow control means in a series connection with the inlet operable to vary the relative coolant flow to the stator; and means to sense the coolant temperature and to change the flow control means to direct lesser relative coolant flow when the coolant temperature becomes too cold for the conductive liquid.

27. A roller electrode combination according to claim 26, further wherein the conductive liquid is of a composite eutectic mixture of gallium (Ga), indium (In), tin (Sn) and zinc (Zn), by weight, being substantially 61% Ga, 25% In, 13% Sn, and 1% Zn, and wherein said means to sense the coolant temperature is set to direct lesser relative coolant flow to the roller electrode so as to preclude a coolant temperature of the order of less than 3 degrees C. at the roller electrode.

28. A roller electrode combination according to claim 27, wherein the means to sense the coolant temperature at the outlet and flow control means further are effective to direct greater relative coolant flow to the roller electrode when the coolant temperature at the outlet increases during welding operation, to above approximately 20 degrees C.

29. An electric resistance seam welding apparatus combination according to claim 27, further wherein the stator passages include annular passages disposed circumferentially of the stator; separate inlet and outlet radial passages located on opposite axial sides of the stator and communicating respectively with the inlet and outlet and with the annular passages, said radial passages being circumferentially offset from one another; and through openings communicating between the annular passages, at locations between the radial passages, thereby defining tortious paths through the stator and causing circumferential flow over all of the annular passages, for high cooling effectiveness of the annular stator surfaces at the defined gaps and particularly opposite said certain annular rotor surfaces, for high cooling effectiveness of the peripherial rotor face via the rotor and the conductive liquid across the gaps.

30. A roller electrode combination according to claim 9, further wherein the protective coating includes gold (Au) plated directly on the annular rotor surfaces and said material from the platinum (Pt) family then being plated on the gold; and wherein said conductive liquid is mercury (Hg).

31. A roller electrode combination according to claim 20, further wherein a thin coating of silver is applied to the walls of the coolant passages, the thickness of the silver coating being between 0.001 and 0.0125 of a millimeter.

32. In an electric resistance seam welding apparatus to weld overlapped edges of a metal blank, including a roller electrode having stator and rotor components, the rotor and stator components having annular surfaces spaced apart across thin gaps, bearing means for mounting said rotor to rotate relative to said stator with movement via said gaps, and a conductive liquid adapted to simultaneously contact said annular surfaces operable to electrically conduct a welding current across said gaps between the stator and rotor components, the improvement comprising the combination of a protective coating formed on said rotor, on the exterior peripherial rotor face adapted to cooperate with the overlapped blank edges, and said protective coating being of rhodium (Rh).

33. A roller electrode combination according to claim 32, wherein said exterior peripherial rotor face has a continuous circumferential groove formed therein adapted to receive and guide a continuous copper wire electrode that in turn is adapted to be urged against the overlapped blank edges, and said protective coating being formed on the faces of the rotor groove, to engage the wire electrode.

34. A roller electrode combination according to claim 33, wherein said protective coating includes gold (Au) plated directly on the rotor and the said rhodium (Rh) plated on the gold.

35. In an electric resistance seam welding apparatus to weld overlapped edges of a metal blank, including a roller electrode having stator and rotor components, the rotor and stator components having annular surfaces spaced apart across thin gaps, bearing means for mounting said rotor to rotate relative to said stator with movement via said gaps, and a conductive liquid adapted to simultaneously contact said annular surfaces operable to electrically conduct a welding current across said gaps between the stator and rotor components, the improvement comprising the combination of using a conductive liquid that remains semi-fluid and/or gelatinous throughout and even beyond its useful life, said conductive liquid being of a composite eutectic mixture of gallium (Ga), indium (In), tin (Sn) and zinc (Zn), by weight, being substantially 61% Ga, 25% In, 13% Sn, and 1% Zn; and of disassemblying the rotor and stator components of the used roller electrode including removing the used conductive liquid; of cleaning the annular surfaces of the stator and rotor components of all traces of the used conductive liquid; of reassemblying the cleaned stator and rotor components including providing bearing means; and of providing a charge of fresh conductive liquid of the same type for the roller electrode, for simultaneously contacting said annular surfaces of the stator and rotor components.

36. A roller electrode combination according to claim 35, further providing the component surfaces that were exposed to the conductive liquid are cleaned by blasting them with glass beads or aluminum oxide, to clean them without removing component material.

37. A roller electrode combination according to claim 35, further providing the stator component has coolant flow passages defined therein, and the coolant passages being cleaned by flushing them with an acetic acid, including with abrasive such as glass beads or aluminum oxide.

38. A roller electrode combination according to claim 37, further providing the component surfaces that were exposed to the conductive liquid are cleaned by blasting them with glass beads or aluminum oxide, to clean them without removing component material.

* * * * *